United States Patent
Ford (10) Patent No.: US 10,140,108 B1
(45) Date of Patent: Nov. 27, 2018

(54) SYSTEMS AND METHODS OF CONFIGURING MANAGED RESOURCES

(71) Applicant: Dell Software Inc., Aliso Viejo, CA (US)

(72) Inventor: Daniel A. Ford, Mount Kisco, NY (US)

(73) Assignee: Dell Products L.P., Round Rock, TX (US)

( * ) Notice: Subject to any disclaimer, the term of this patent is extended or adjusted under 35 U.S.C. 154(b) by 376 days.

(21) Appl. No.: 14/970,186

(22) Filed: Dec. 15, 2015

(51) Int. Cl.
| | |
|---|---|
| G06F 9/445 | (2018.01) |
| H04L 12/24 | (2006.01) |
| H04L 29/08 | (2006.01) |
| H04L 29/06 | (2006.01) |
| G06F 8/61 | (2018.01) |

(52) U.S. Cl.
CPC .............. *G06F 8/64* (2013.01); *H04L 41/082* (2013.01); *H04L 63/0428* (2013.01); *H04L 67/34* (2013.01)

(58) Field of Classification Search
CPC ..... G06F 8/64; H04L 41/082; H04L 63/0428; H04L 67/34
See application file for complete search history.

(56) References Cited

U.S. PATENT DOCUMENTS

| | | | |
|---|---|---|---|
| 8,738,746 B2 | 5/2014 | White et al. | |
| 9,042,379 B2 | 5/2015 | Berg et al. | |
| 9,137,092 B2 | 9/2015 | Berg et al. | |
| 2003/0014669 A1* | 1/2003 | Caceres | .............. H04L 63/1433 726/25 |
| 2007/0168728 A1* | 7/2007 | Blouin | .................. G06F 11/263 714/25 |
| 2009/0100421 A1* | 4/2009 | Flaming | .................... G06F 8/68 717/174 |
| 2014/0282895 A1* | 9/2014 | Stuntebeck | ............. G06F 21/34 726/4 |

OTHER PUBLICATIONS

Shuttleworth, Mark, https://insights.ubuntu.com/2014/12/09/announcing-ubuntu-core-with-snappy-transactional-updates/ Dec. 9, 2014.*

(Continued)

*Primary Examiner* — Viva Miller
(74) *Attorney, Agent, or Firm* — Winstead PC (57) ABSTRACT

In one embodiment, a method is performed by a computer system. The method includes receiving a trigger to setup a target resource for remote control at a management system, wherein an operating system of the target resource enforces a transactional installation process for new software, wherein the operating system designates user-writable storage. The method further includes, responsive to the trigger, retrieving prerequisite client-side software of the management system. In addition, the method includes creating a remote connection to the target resource using an encrypted network protocol. Further, the method includes copying, via the remote connection, the prerequisite client-side software to the user-writable storage. Moreover, the method includes causing the copied prerequisite client-side software to be installed in the user-writable storage of the target resource, thereby bypassing the transactional installation process of the operating system of the target resource.

20 Claims, 3 Drawing Sheets

(56) References Cited

OTHER PUBLICATIONS

Wikimedia Foundation, Inc.; "Salt (software)"; https://en.wikipedia.org/wiki/Salt_(software); last modified on Nov. 25, 2015; 4 pages.
Wikimedia Foundation, Inc.; "Ubuntu Touch"; https://en.wikipedia.org/wiki/Ubuntu_Touch; last modified on Nov. 6, 2015; 7 pages.
Wikimedia Foundation, Inc.; "Vagrant (software)"; https://en.wikipedia.org/wiki/Vagrant_(software); last modified on Nov. 19, 2015; 2 pages.
Wikimedia Foundation, Inc.; "Chef (software)"; https://en.wikipedia.org/wiki/Chef_(software); last modified on Dec. 12, 2015; 3 pages.
Wikimedia Foundation, Inc.; "Snappy (package manager)"; https://en.wikipedia.org/wiki/Snappy_(package_manager); last modified on Nov. 10, 2015, 1 page.
Wikimedia Foundation, Inc.; "Puppet (software)"; https://en.wikipedia.org/wiki/Puppet_(software); last modified on Nov. 25, 2015; 3 pages.
Wikimedia Foundation, Inc.; "Ansible (software)"; https://en.wikipedia.org/wiki/Ansible_(software); last modified on Dec. 11, 2015; 5 pages.
Wikimedia Foundation, Inc.; "Secure copy"; https://en.wikipedia.org/wiki/Secure_copy; last modified on Nov. 9, 2015; 3 pages.
Wikimedia Foundation, Inc.; "Secure Shell"; https://en.wikipedia.org/wiki/Secure_Shell; last modified on Dec. 2, 2015; 10 pages.
Wikimedia Foundation, Inc.; "PyPy"; https://en.wikipedia.org/wiki/PyPy; last modified on Nov. 30, 2015; 4 pages.

* cited by examiner

SYSTEMS AND METHODS OF CONFIGURING MANAGED RESOURCES

BACKGROUND

Technical Field

The present disclosure relates generally to resource management and more particularly, but not by way of limitation, to systems and methods of configuring managed resources.

History of Related Art

An emerging trend in the implementation and configuration of operating systems is to restrict the flexibility with which additional application or user-level software can be installed. While these restrictions can achieve certain advantages, such restrictions can also make it difficult to provision and manage computer systems in a scalable fashion.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system. The method includes receiving a trigger to setup a target resource for remote control at a management system, wherein an operating system of the target resource enforces a transactional installation process for new software, wherein the operating system designates user-writable storage and non-user-writable storage on the target resource. The method further includes, responsive to the trigger, retrieving prerequisite client-side software of the management system using a file-transfer mechanism that is disallowed by the operating system of the target resource. In addition, the method includes creating a remote connection to the target resource using an encrypted network protocol that is allowed by the operating system of the target resource. Further, the method includes copying, via the remote connection, the prerequisite client-side software to the user-writable storage of the target resource. Moreover, the method includes causing, via the remote connection, the copied prerequisite client-side software to be installed in the user-writable storage of the target resource, thereby bypassing the transactional installation process of the operating system of the target resource.

In one embodiment, an information handling system includes a processor. The processor is operable to implement a method. The method includes receiving a trigger to setup a target resource for remote control at a management system, wherein an operating system of the target resource enforces a transactional installation process for new software, wherein the operating system designates user-writable storage and non-user-writable storage on the target resource. The method further includes, responsive to the trigger, retrieving prerequisite client-side software of the management system using a file-transfer mechanism that is disallowed by the operating system of the target resource. In addition, the method includes creating a remote connection to the target resource using an encrypted network protocol that is allowed by the operating system of the target resource. Further, the method includes copying, via the remote connection, the prerequisite client-side software to the user-writable storage of the target resource. Moreover, the method includes causing, via the remote connection, the copied prerequisite client-side software to be installed in the user-writable storage of the target resource, thereby bypassing the transactional installation process of the operating system of the target resource.

In one embodiment, a computer-program product includes a non-transitory computer-usable medium having computer-readable program code embodied therein. The computer-readable program code is adapted to be executed to implement a method. The method includes receiving a trigger to setup a target resource for remote control at a management system, wherein an operating system of the target resource enforces a transactional installation process for new software, wherein the operating system designates user-writable storage and non-user-writable storage on the target resource. The method further includes, responsive to the trigger, retrieving prerequisite client-side software of the management system using a file-transfer mechanism that is disallowed by the operating system of the target resource. In addition, the method includes creating a remote connection to the target resource using an encrypted network protocol that is allowed by the operating system of the target resource. Further, the method includes copying, via the remote connection, the prerequisite client-side software to the user-writable storage of the target resource. Moreover, the method includes causing, via the remote connection, the copied prerequisite client-side software to be installed in the user-writable storage of the target resource, thereby bypassing the transactional installation process of the operating system of the target resource.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

In various embodiments, operating systems employ a transactional software-installation process in an attempt to make the operating systems as foolproof as possible. Examples of operating systems that may employ a transactional software-installation process include versions of IOS by APPLE, versions of ANDROID, versions of MICROSOFT WINDOWS, distributions of LINUX such as UBUNTU, etc. In some cases, transactional software-installation processes are evidenced by software installation being restricted to a curated set of applications that can only be downloaded from a limited number of fixed and managed application stores.

Many of these operating systems tend to be designed and targeted for use in application domains where little to no management expertise is available or where the host computer is difficult to access and/or manually configure. In both cases, restrictions on the installation of software prevent inconsistent software configurations that would be very difficult to resolve. Examples of these domains include smartphones and sophisticated embedded controllers such as machines used as Internet of Things (IoT) gateways. A more particular example is a computer operating as a controller of other IoT devices, often called an IoT gateway, in a building management application, where the computer might be placed in a remote area that is difficult to access.

Transactional software-installation processes typically attempt to guarantee isolation and atomicity. In general, the isolation guarantee means that operations within a transaction are hidden from other threads on the system until the transaction commits, and that interfering operations on the system will be properly serialized with the transaction. In general, the atomicity guarantee means that operations inside of a transaction are either: (1) all committed; or (2) the transaction can be aborted and the system discards all of its partial results. Thus, if there is a crash or power failure, after recovery, the stored state will generally be consistent. That is, either the software will be completely installed or the failed installation will be completely rolled back. As part of the atomicity guarantee, an unusable partial install will not be left on the system.

While the practice of employing transactional software installation has some advantages, it also has various disadvantages. For instance, the restrictions typically built into transactional software installation usually prohibit the use of tools designed to automate operating system provisioning and configuration. Examples of such tools include CHEF, PUPPET, ANSIBLE and SALT STACK. These tools typically require prerequisite client-side software to be installed on the target resource to facilitate their interaction and control of the target resource. Many, for instance, require an agent to be installed on the target resource before it can be managed. Others, such as ANSIBLE, require a PYTHON interpreter to be installed.

As a general matter, transactional software-installation processes make it non-trivial, or practically impossible, to install prerequisite client-side software of the type described above. This is because, for purposes of enforcing the transactional software-installation processes, such operating systems may disallow certain file-transfer mechanisms such as, for example, file-transfer commands that are used to download files. In an example, on SNAPPY UBUNTU CORE, the DEBIAN package manager, "apt" package management tools and the file transfer utilities "wget" and "curl" have been removed. In addition, in SNAPPY UBUNTU CORE, much of the file system where software would normally be installed has been made "read-only," making it impossible to store installed software in conventional file-system locations.

Thus, transactional software-installation processes are, by design, extremely difficult to circumvent. However, this also means that the types of software tools described above that perform provisioning and management are difficult or impossible to leverage because their prerequisite client-side software cannot be installed. Not being able to leverage such software tools is a serious issue as it implies that machines will need to be provisioned and configured manually via the command line, one installation at a time. For example, in the case of IoT devices, with potentially hundreds, thousands, or even more IoT devices being installed in any given deployment, the lack of such tooling could be a major impediment to speed of execution.

The present disclosure describes examples of enabling the use of software tools that automate the provisioning and configuration of computers even when those computers are running operating systems with restrictive software-installation constraints such as transactional software-installation processes. In certain embodiments, transactional software-installation processes can be bypassed by downloading prerequisite client-side software first to a management node, or user system. Thereafter, the prerequisite client-side software can be transferred to a target resource using an alternative, effectively unblockable, file-transfer mechanism, to a user-writable portion of a file system under a user's account.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
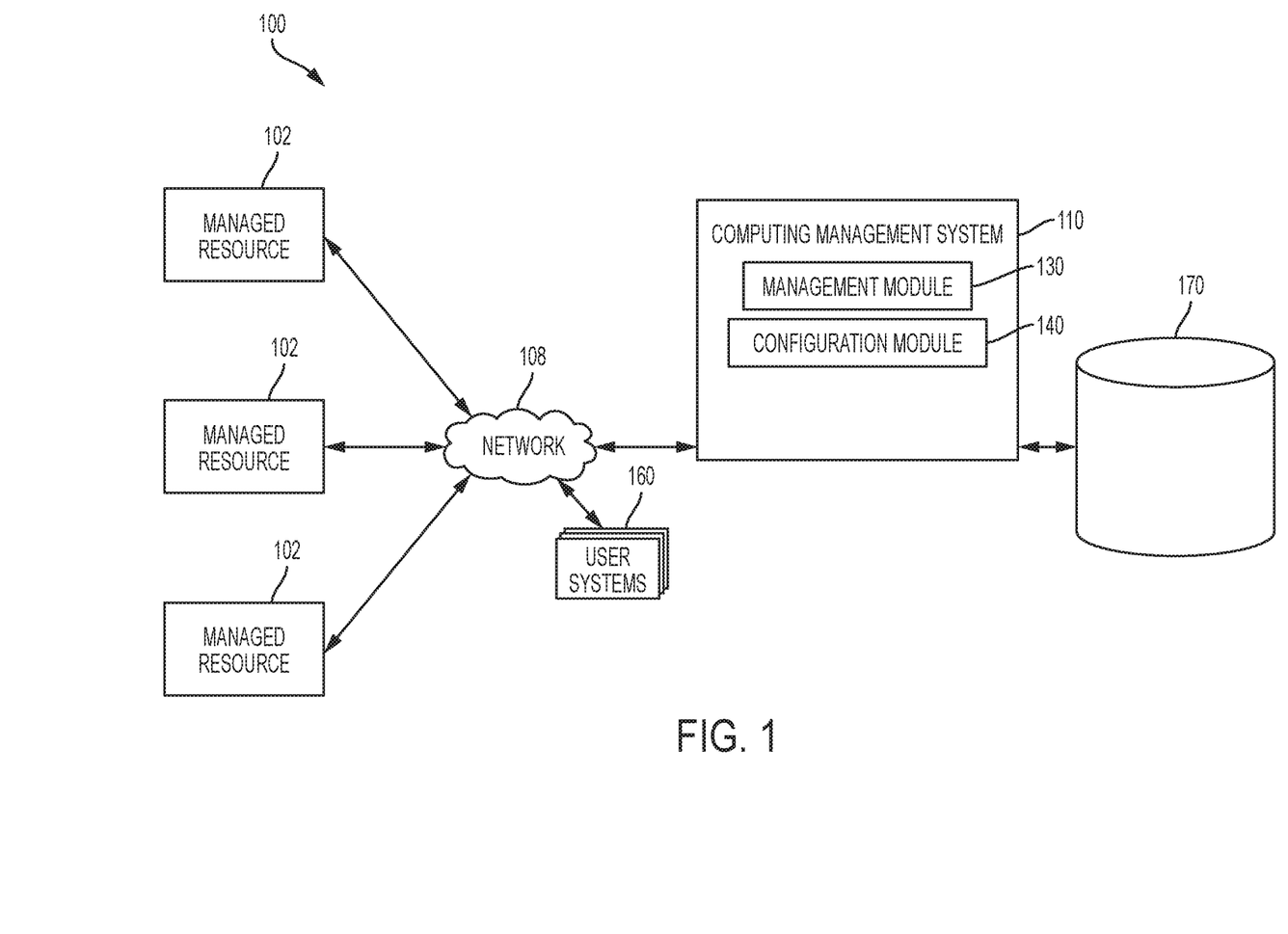
FIG. 1 illustrates an example computing environment for implementing an embodiment of a computing management system.

FIG. 1 illustrates an example computing environment 100 for implementing an embodiment of a computing management system 110. The computing environment 100 includes the computing management system 110, resources 102, user systems 160 and one or more data stores 170 that are each operable to communicate over a network 108. The network 108 may be a private network, a public network, a local or wide area network, a portion of the Internet, combinations of the same, and/or the like.

The computing management system 110 can manage and/or monitor the resources 102 for performance tuning reasons, troubleshooting, or other reasons. The managed resources 102 may, for instance, include devices in a data center or in a plurality of data centers. Some examples of the managed resources 102 include the following: information handling systems, smartphones, tablet computers, wearable or body-borne computers, IoT gateways, IoT devices, virtual machines, servers, web servers, application servers, network switches and other network hardware, combinations of same, and/or the like. The managed resources 102 can be geographically separate or co-located.

In general, some or all of the resources 102 can have operating systems that enforce a transactional software-installation process of the type described above. Examples of operating systems include a version of IOS by APPLE, ANDROID or MICROSOFT WINDOWS, distributions of LINUX such as UBUNTU, etc. The operating systems of the resources 102 typically designate user-writable storage and non-user-writable storage in a file system. In various cases, the user-writable storage and non-user-writable storage can be partitions of the file system. The user-writable storage can be, or include, for example, a user home directory that include a user's files, including text documents, music, pictures videos, etc. The non-user-writable storage can include the remainder of the file system which is not user-writable (e.g., read-only). For example, the non-user-writable storage can be used for program binaries, libraries, configuration files, other system files, etc. that are protected by the transactional installation processes.

In certain embodiments, features of the components of the computing management system 110 can be made accessible over an interface to the user systems 160. The user systems 160 can include any type of computing device, including information handling systems such as desktops, laptops, tablets, smartphones, PDAs, to name a few. The user systems 160 can be operated by users associated with the tenants or by other users. In some embodiments, some or all of the components of the computing management system 110 can reside on the user systems 160. In an example, the configuration module 140 can reside on the user systems 160 so that the user systems, in effect, serve as nodes to effect configuration of the managed resources 102.

The computing management system 110 can include a management module 130 and a configuration module 140. Each of these components can be implemented with hardware and/or software, including (optionally) virtual machines and containers. In an example, the computing management system 110 can be implemented as a single management server. In another example, the computing management system 110 can be implemented in a plurality of virtual or physical servers, which may or may not be geographically co-located. For example, the computing management system 110 and/or other aspects of the computing environment 100 may be hosted in a cloud-based hosting service such as the Azure™ service provided by Microsoft® or the EC2™ platform provided by Amazon®.

The management module 130 can serve to manage resources such as, for example, the managed resources 102. In certain embodiments, the management module 130 can include, or be based on, management and/or provisioning software tools such as, for example, CHEF, PUPPET, ANSIBLE, SALT STACK, combinations of same and/or the like. In certain embodiments, the management module 130 can issue commands using one or more of these software tools to control operation of the resources 102. In some cases, the management module 130 can publish a configuration interface to the user systems 160, for example, for administrators, super users or other users to select or specify such commands. The configuration module 140 can cause prerequisite client-side software of the management module 130, such as interpreters and agents, to be installed on the managed resources 102. Example operation of the configuration module 140 will be described in relation to FIG. 3.

Figure 2:
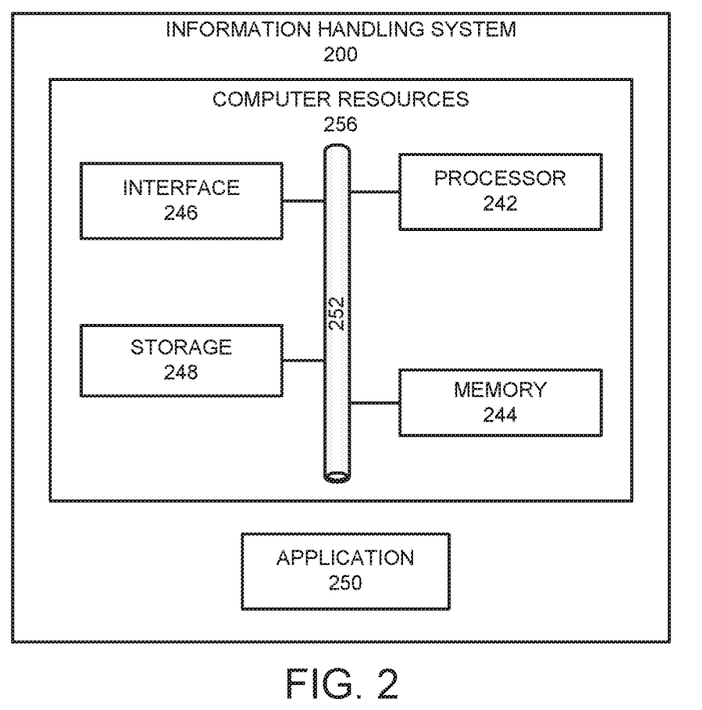
FIG. 2 illustrates an example of an information handling system.

FIG. 2 illustrates an example of an information handling system 200 that, in some cases, can be representative, for example, of the managed resources 102, the user systems 160, and/or all or part of the computing management system 110. The information handling system 200 includes an application 250 operable to execute on computer resources 256. The application 250 can be similar, for example, to the management module 130 and/or the configuration module 140. In particular embodiments, the information handling system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 200 may comprise any suitable physical form, configuration, number, type and/or layout. As an example, and not by way of limitation, the information handling system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 200 may include one or more computer systems; be unitary or distributed; span multiple locations; span multiple machines; or reside in a cloud, which may include one or more cloud components in one or more networks.

In the depicted embodiment, the information handling system 200 includes a processor 242, memory 244, storage 248, interface 246, and bus 252. Although a particular information handling system is depicted having a particular number of particular components in a particular arrangement, this disclosure contemplates any suitable information handling system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing at processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the information handling system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the information handling system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the information handling system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which information handling system 200 is used. As an example and not by way of limitation, information handling system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 200 may include any suitable interface 246 for any one or more of these networks, where appropriate.

In some embodiments, interface 246 may include one or more interfaces for one or more I/O devices. One or more of these I/O devices may enable communication between a person and the information handling system 200. As an example and not by way of limitation, an I/O device may include a keyboard, keypad, microphone, monitor, mouse, printer, scanner, speaker, still camera, stylus, tablet, touch-screen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the information handling system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
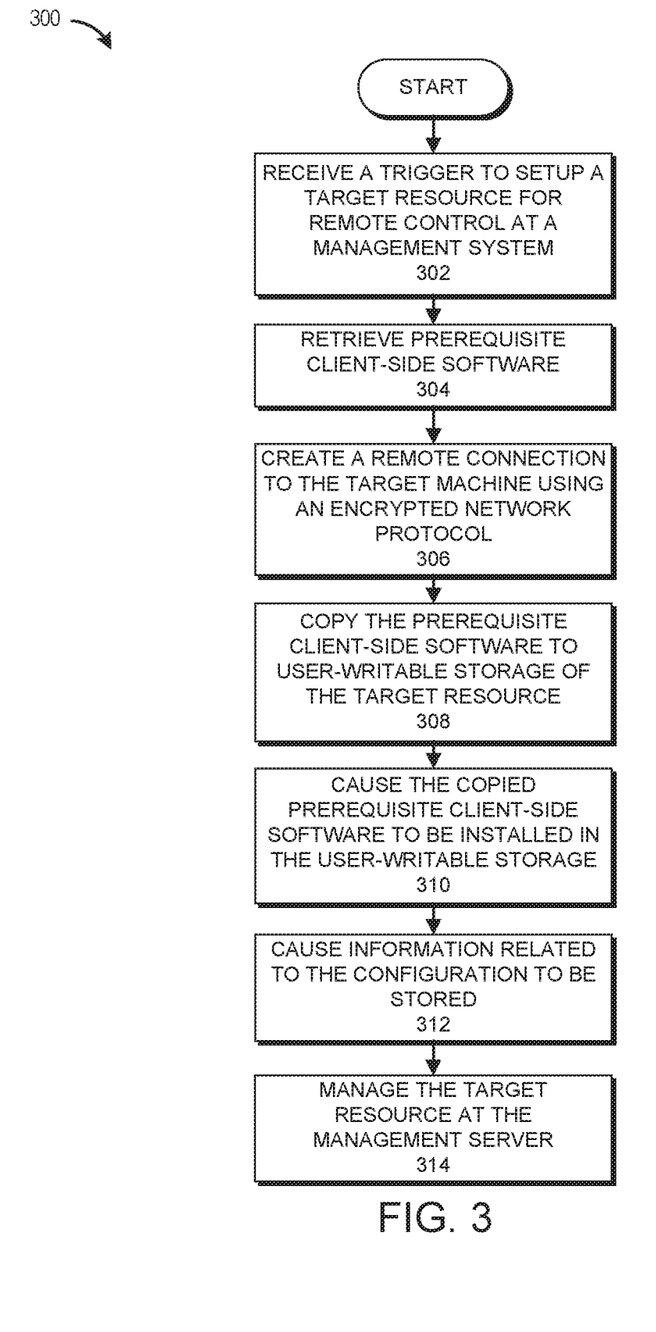
FIG. 3 illustrates an example of a process for configuring and managing resources.

FIG. 3 illustrates an example of a process 300 for configuring and managing resources such as the managed resources 102 of FIG. 1. The process 300 can be implemented by any system that can process data. For example, the process 300, in whole or in part, can be implemented by one or more of the management module 130, the configuration module 140 and/or any of the managed resources 102. In some cases, the process 300 can be performed generally by the computing management system 110 or the computing environment 100. Although any number of systems, in whole or in part, can implement the process 300, to simplify discussion, the process 300 will be described in relation to particular components or systems of the computing environment 100 of FIG. 1.

At block 302, the configuration module 140 receives a trigger to setup a target resource for remote control at a management system such as, for example, the management module 130 of the computing management system 110 of FIG. 1. The target resource can be, for example, one of the managed resources 102 of FIG. 1. In various cases, the trigger can be received via one of the user systems 160, for example. In other cases, the trigger can be from the management module 130. In these cases, the management module 130 can send the trigger in response to a request, for example, from one of the user systems 160, to manage the target resource. In some cases, the management module 130 can send the trigger after determining that the target resource does not have the prerequisite client-side software installed thereon. The trigger can also be a self-trigger, a scheduled trigger, combinations of the foregoing and/or the like.

At block 304, the configuration module 140 retrieves prerequisite client-side software of the management module 130. In certain embodiments, the configuration module 140 can retrieve the prerequisite client-side software from a source external to the computing management system 110 using a file-transfer mechanism that is disallowed by an operating system of the target resource. In an example, if the operating system of the target resource is SNAPPY UBUNTU CORE as described above, "wget" may be used by a particular user system of the user systems 160 to download the archive file thereto. For example, the block 304 can include the particular user system downloading an archive file containing the prerequisite client-side software.

At block 306, the configuration module 140 creates a remote connection to the target resource using an encrypted network protocol that is not typically blocked by the operating system of the target resource. In certain embodiments, an example of a difficult-to-block, or rarely blocked, encrypted network protocol that can be used is secure shell (SSH).

At block 308, the configuration module 140 copies, via the remote connection, the prerequisite client-side software to the user-writable storage using a copy protocol that is not typically blocked by the operating system of the target resource. In some embodiments, the configuration module 140 can use a copy mechanism associated with the encrypted network protocol. In an example, in implementations utilizing SSH, the copy mechanism can be the secure copy (SCP) protocol.

At block 310, the configuration module 140 causes the copied prerequisite client-side software to be installed in user-writable storage of the target resource. In certain embodiments, the block 310 can include executing various commands to make the prerequisite client-side software conveniently usable. For example, the block 310 can include creating a folder, extracting the archive file to the folder, deleting the archive file after the extraction, creating a binaries folder and creating a link on the remote resource from the binaries folder to an executable of the prerequisite client-side software. It should be appreciated that the foregoing tasks are merely examples of types of functionality that can occur at the block 310.

At block 312, the configuration module 140 causes information related to the configuration to be stored or recorded, for example, in the data store 170. In certain embodiments, the configuration module 140 can store information sufficient to identify and manage the target resource as configured. At block 314, the management module 130 manages the target resource, for example, by periodically sending commands to the target resource. In certain embodiments, the commands can be triggered or relayed by one or more the user systems 160. In addition, the target resource can be aggregately managed along with many other resources such as, for example, the managed resources 102. The process 300 can be repeated for any number of resources such as, for example, the managed resources 102. In that way, numerous resources can be automatically configured for management by the management module 130.

An example sequence of steps and corresponding commands that can be executed during the process 300 of FIG. 3 are shown in Table 1. In the example of Table 1, a PYTHON interpreter serves as example prerequisite client-side software. Table 2 provides a description of variables used in the example commands of Table 1.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

TABLE 1

| Task | Example Commands |
|---|---|
| (1) Determine that PYTHON interpreter has not already been installed on the remote resource. | raw: stat $HOME/.pypy{{pypy_version}} |
| (2) Determine that archive file has not already been downloaded. | local_action: command stat /tmp/{{pypy_archive_file}} register: archive_downloaded |
| (3) Download archive file for PYTHON interpreter to management node. | local_action: command wget -O /tmp/{{pypy_archive_file}} https://bitbucket.org/pypy/pypy/downloads/{{pypy_archive_file}} |
| (4) Copy the archive file to the remote resource. | local_action: command scp /tmp/{{pypy_archive_file} {{pypy_ssh_user}}@{{inventory_hostname}}:{{pypy_archive_file}} |
| (5) Create a folder for extraction of the archive file on the remote resource. | raw: mkdir {{pypy_install_folder}} |
| (6) Extract files from the archive file into the folder. | raw: tar -xjf {{pypy_archive_file}} -C {{pypy_install_folder}} --strip-components=1 |
| (7) Delete the archive file from the remote resource. | raw: rm {{pypy_archive_file}} |
| (8) Make a link on the remote resource from binaries folder to executable of PYTHON interpreter. | raw: ln -s $HOME/{{pypy_install_folder}}/bin/pypy $HOME/bin/python |
| (9) Record the install of the PYTHON interpreter on the remote resource. | raw: touch $HOME/.pypy{{pypy_version}} |

TABLE 2

| Variable | Description of Variable |
|---|---|
| pypy_version | Represents the version of the PYTHON interpreter to install. |
| pypy_archive_file | Represents a name of an archive file containing the version of the PYTHON interpreter to install. |
| pypy_ssh_user | Represents an identifier of an SSH account to use to perform remote operations and transfers using SSH and SCP. |
| inventory_hostname | Represents a name of the computer serving the archive file. |
| pypy_install_folder | Represents a name of a folder into which the PYTHON interpreter should be installed on the target machine. |

What is claimed is:

1. A method comprising, by a computer system:
receiving a trigger to setup a target resource for remote control at a management system, wherein an operating system of the target resource enforces a transactional installation process for new software, wherein the operating system designates user-writable storage and non-user-writable storage on the target resource;

responsive to the trigger, retrieving prerequisite client-side software of the management system using a file-transfer mechanism that is disallowed by the operating system of the target resource;

creating a remote connection to the target resource using an encrypted network protocol that is allowed by the operating system of the target resource;

copying, via the remote connection, the prerequisite client-side software to the user-writable storage of the target resource; and causing, via the remote connection, the copied prerequisite client-side software to be installed in the user-writable storage of the target resource, thereby bypassing the transactional installation process of the operating system of the target resource.

2. The method of claim 1, wherein the encrypted network protocol comprises secure shell (SSH).

3. The method of claim 1, wherein the copying comprises utilizing secure copy (SCP).

4. The method of claim 1, comprising managing the target resource via the installed prerequisite client-side software.

5. The method of claim 1, wherein the prerequisite client-side software comprises at least one of an interpreter and an agent.

6. The method of claim 1, wherein the transactional installation process provides an atomicity guarantee.

7. The method of claim 1, wherein the user-writable storage comprises a user home directory.

8. An information handling system comprising a processor, wherein the processor is operable to implement a method comprising:

receiving a trigger to setup a target resource for remote control at a management system, wherein an operating system of the target resource enforces a transactional installation process for new software, wherein the operating system designates user-writable storage and non-user-writable storage on the target resource;

responsive to the trigger, retrieving prerequisite client-side software of the management system using a file-transfer mechanism that is disallowed by the operating system of the target resource;

creating a remote connection to the target resource using an encrypted network protocol that is allowed by the operating system of the target resource;

copying, via the remote connection, the prerequisite client-side software to the user-writable storage of the target resource; and causing, via the remote connection, the copied prerequisite client-side software to be installed in the user-writable storage of the target resource, thereby bypassing the transactional installation process of the operating system of the target resource.

9. The information handling system of claim 8, wherein the encrypted network protocol comprises secure shell (SSH).

10. The information handling system of claim 8, wherein the copying comprises utilizing secure copy (SCP).

11. The information handling system of claim 8, the method comprising managing the target resource via the installed prerequisite client-side software.

12. The information handling system of claim 8, wherein the prerequisite client-side software comprises at least one of an interpreter and an agent.

13. The information handling system of claim 8, wherein the transactional installation process provides an atomicity guarantee.

14. The information handling system of claim 8, wherein the user-writable storage comprises a user home directory.

15. A computer-program product comprising a non-transitory computer-usable medium having computer-readable program code embodied therein, the computer-readable program code adapted to be executed to implement a method comprising:

receiving a trigger to setup a target resource for remote control at a management system, wherein an operating system of the target resource enforces a transactional installation process for new software, wherein the operating system designates user-writable storage and non-user-writable storage on the target resource;

responsive to the trigger, retrieving prerequisite client-side software of the management system using a file-transfer mechanism that is disallowed by the operating system of the target resource;

creating a remote connection to the target resource using an encrypted network protocol that is allowed by the operating system of the target resource;

copying, via the remote connection, the prerequisite client-side software to the user-writable storage of the target resource; and causing, via the remote connection, the copied prerequisite client-side software to be installed in the user-writable storage of the target resource, thereby bypassing the transactional installation process of the operating system of the target resource.

16. The computer-program product of claim 15, wherein the encrypted network protocol comprises secure shell (SSH).

17. The computer-program product of claim 15, wherein the copying comprises utilizing secure copy (SCP).

18. The computer-program product of claim 15, the method comprising managing the target resource via the installed prerequisite client-side software.

19. The computer-program product of claim 15, wherein the prerequisite client-side software comprises at least one of an interpreter and an agent.

20. The computer-program product of claim 15, wherein the transactional installation process provides an atomicity guarantee.

* * * * *